March 3, 1964     R. D. LICHTI     3,123,167
STEERING SYSTEM FOR STEERABLE, TELESCOPING LOADING RAMP
Filed Aug. 12, 1960     4 Sheets-Sheet 1
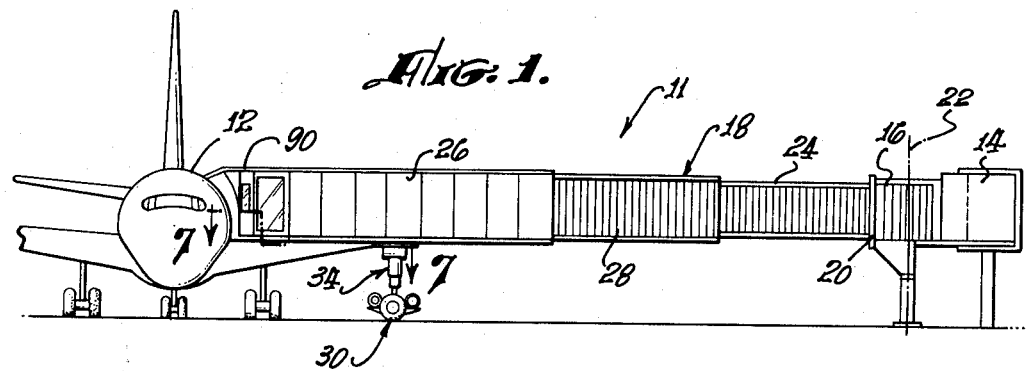
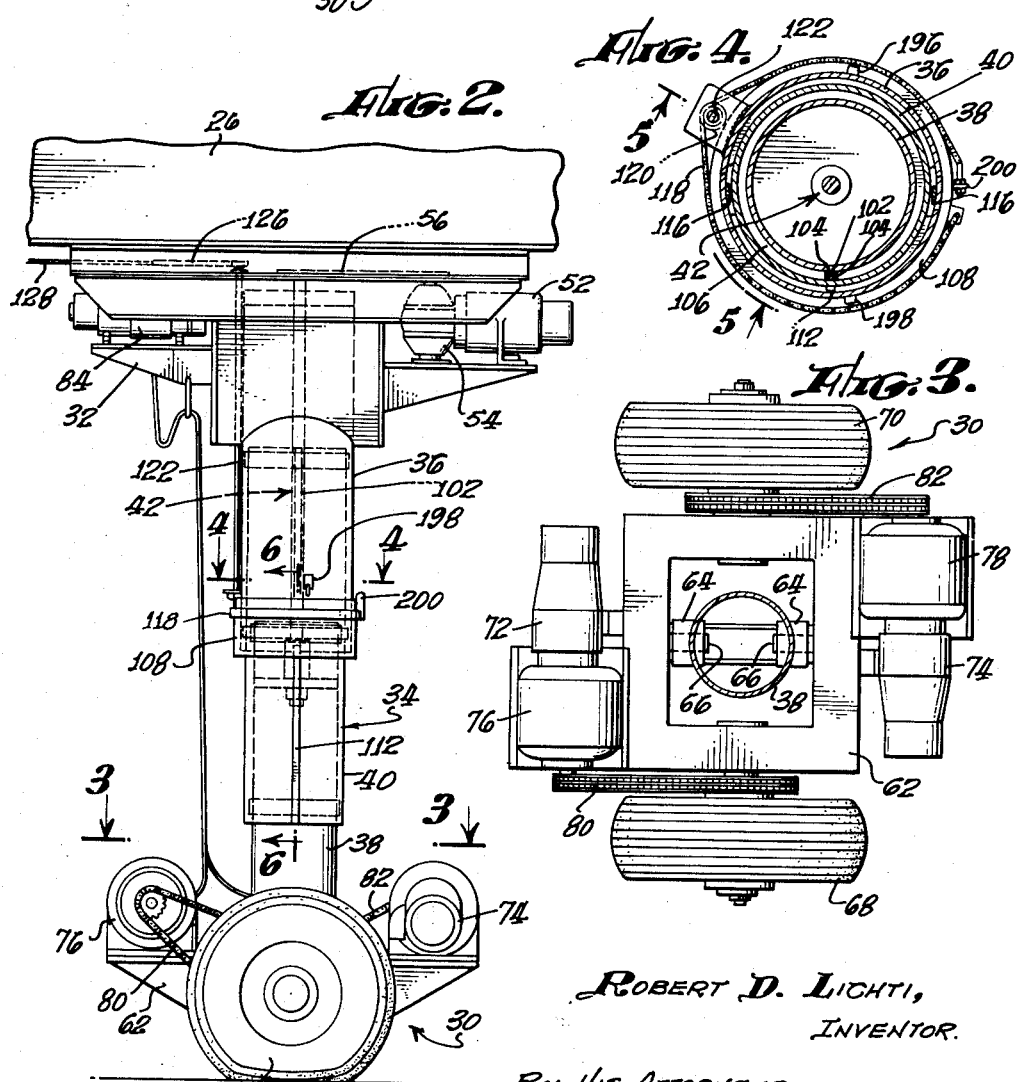
Robert D. Lichti,
INVENTOR.
By His Attorneys
Harris, Kiech, Russell & Kern.

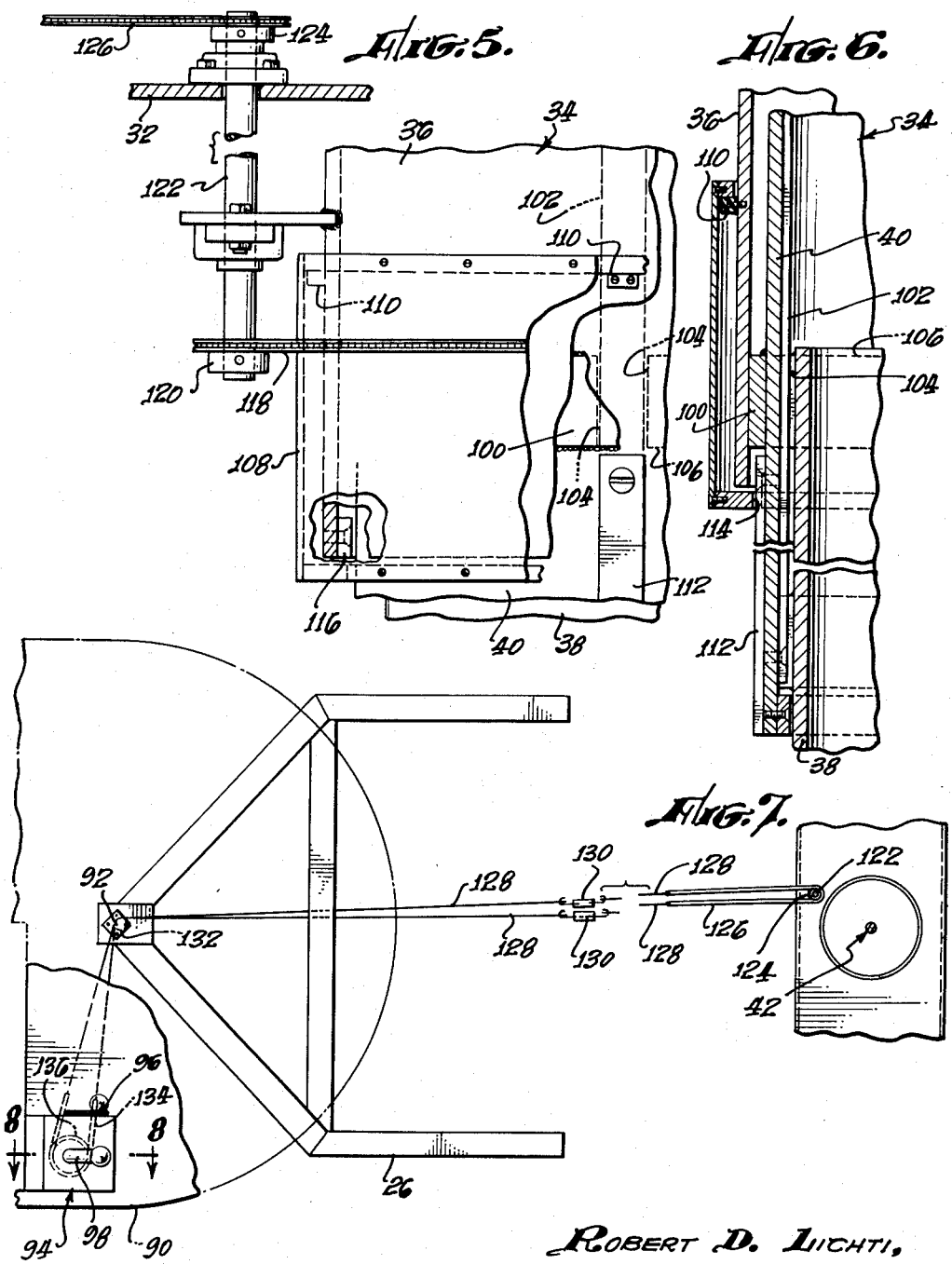

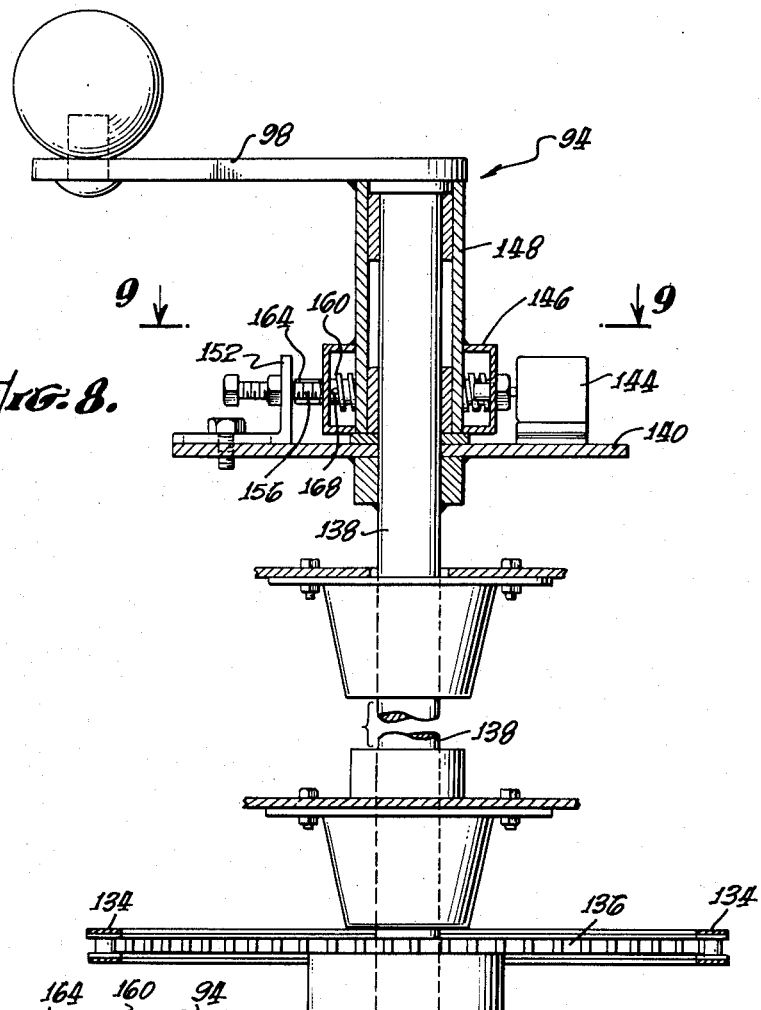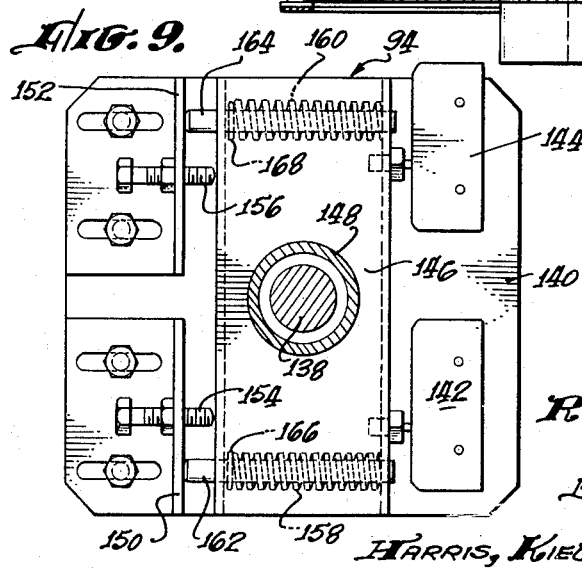

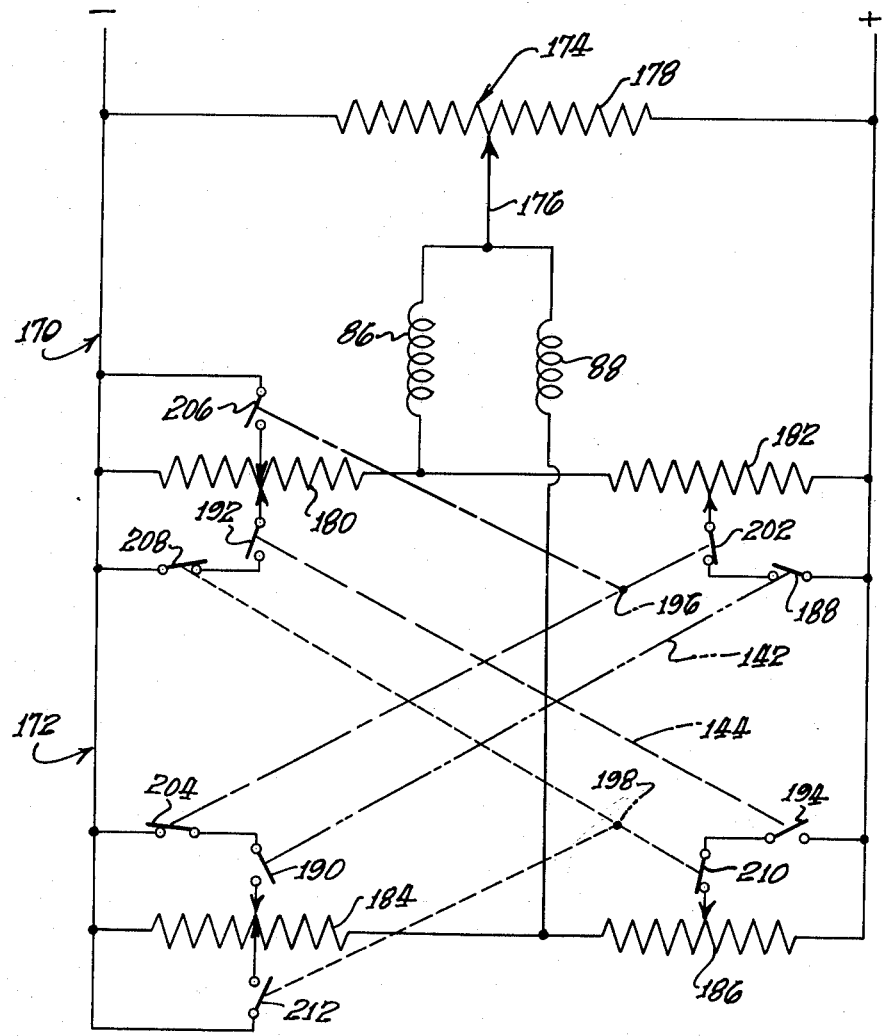

United States Patent Office 3,123,167
Patented Mar. 3, 1964

3,123,167
STEERING SYSTEM FOR STEERABLE,
TELESCOPING LOADING RAMP
Robert D. Lichti, Long Beach, Calif., assignor, by mesne assignments, to Stanray Corporation, Chicago, Ill., a corporation of Delaware
Filed Aug. 12, 1960, Ser. No. 49,219
7 Claims. (Cl. 180—6.5)

The present invention relates in general to a loading and unloading ramp intended primarily for use with airplanes, or other vehicles, to load and unload passengers, although it may be utilized for other purposes.

More particularly, the invention contemplates a loading and unloading ramp which includes a telescoping ramp means adapted to bridge the space between a doorway of an airplane and a point of embarkation and debarkation located generally on the same horizontal level so that the telescoping ramp means is always generally horizontal. The telescoping ramp means includes an inner tunnel connected at its inner end to a supporting means for pivotal movement about a vertical axis and about a horizontal axis extending transversely of the ramp means, whereby the outer end of an outer tunnel of the ramp means may be pivoted both horizontally and vertically into register with the doorway in the airplane. The telescoping ramp means may include only the inner and outer tunnels mentioned, or it may also include one or more intermediate tunnels.

The invention further contemplates a supporting vehicle or truck for the outer tunnel of the telescoping ramp means which is vertically extensible and contractible to raise and lower the outer end of the outer tunnel, and which is self-propelled and steerable relative to the ramp means about a vertical axis to extend and contract the telescoping ramp means and to swing the outer end thereof horizontally. More particularly, the invention further contemplates a self-propelled steerable vehicle which includes a frame pivotable about a vertical axis, two wheels rotatably mounted on the frame on opposite sides of the vertical axis, and two reversible motors mounted on the frame and respectively connected to the wheels in driving relation therewith.

A primary object of the present invention is to provide an improved speed control and steering system for a self-propelled steerable vehicle of the foregoing nature.

More particularly, a primary object of the invention is to provide interconnected speed control means for varying the speeds of the driving motors and steering means for varying the relative speeds of the driving motors to pivot the frame of the vehicle about its vertical axis.

An important object of the invention is to provide means interconnecting the speed control means and the steering means in such a manner that the turning radius of the vehicle varies directly with the average of the speeds of the driving motors. With this construction, the turning radius of the vehicle is small when the average motor speed is low and is large when the average motor speed is high. Consequently, maximum steering is achieved at low vehicle speeds and minimum steering at high vehicle speeds, which is an important feature of the invention.

Another object of the invention is to provide a self-propelled steerable vehicle of the foregoing nature wherein the driving motors are reversible motors so that the vehicle may be propelled in opposite directions. With this construction, the driving motors may also rotate in opposite directions at equal speeds to pivot the vehicle about its vertical axis without movement of the vehicle. Under such conditions, the maximum possible steering rate is obtained, both the average speed of the driving motors and the turning radius of the vehicle being zero.

An extremely important object of the invention is to provide a speed control and steering system for the vehicle which includes two bridge circuits respectively operatively connected to the driving motors and controlling the respective speeds thereof, speed control means common to and forming parts of the bridge circuits for simultaneously and equally unbalancing the bridge circuits in the same directions to simultaneously and equally vary the speeds of the motors in the same directions, and steering means for relatively unbalancing the bridge circuits in opposite directions so as to vary the relative speeds of the motors and thus pivot the vehicle about its vertical axis.

Another object is to provide a speed control and steering system of the foregoing character wherein the steering means interconnects the bridge circuits and unbalances them simultaneously and equally, but in opposite directions, so as to simultaneously and equally, but oppositely, vary the speeds of the driving motors.

Another object of the invention is to provide means responsive to pivoting of the vehicle about its vertical pivot axis to predetermined limit positions for reversing the opposite unbalance of the bridge circuits produced by the steering means. With this construction, when the vehicle is pivoted about its vertical axis to one end of its steering range, it is automatically pivoted in the opposite direction away from the corresponding end of its steering range.

Another object of the invention is to provide a speed control and steering system for the self-propelled steerable vehicle wherein the steering means includes a steering member pivotally mounted on the outer tunnel of the telescoping ramp means, and means interconnecting the frame of the vehicle and the steering member for pivoting the steering member relative to the outer tunnel in synchronism with pivoting of the frame of the vehicle relative to the outer tunnel.

The foregoing objects, advantages, features and results of the present invention, together with various other objects, advantages, features and results thereof which will be evident to those skilled in the art to which the invention relates in the light of this disclosure, may be achieved with the exemplary embodiment of the invention described in detail hereinafter and illustrated in the accompanying drawings, wherein:

FIG. 1 is a side elevational view of a loading and unloading ramp which incorporates the present invention;

FIG. 2 is an enlarged side elevational view showing a fragment of a telescoping ramp means of the loading and unloading ramp and showing a self-propelled, steerable, vertically extensible and contractible truck or vehicle of the invention for supporting the outer end of the telescoping ramp means;

FIG. 3 is a horizontal sectional view taken along the arrowed line 3—3 of FIG. 2;

FIG. 4 is an enlarged, horizontal sectional view taken along the arrow line 4—4 of FIG. 2;

FIG. 5 is an enlarged, fragmentary side elevational view taken along the arrowed line 5—5 of FIG. 4;

FIG. 6 is an enlarged, fragmentary vertical sectional view taken along the arrowed line 6—6 of FIG. 2;

FIG. 7 is an enlarged, fragmentary, horizontal sectional view taken along the irregular arrowed line 7—7 of FIG. 1;

FIG. 8 is an enlarged, fragmentary, vertical sectional view taken along the arrowed line 8—8 of FIG. 7;

FIG. 9 is a horizontal sectional view taken along the arrowed line 9—9 of FIG. 8; and FIG. 10 is a diagrammatic view showing the electrical circuitry of a speed control and steering system of the invention.

Referring initially to FIG. 1 of the drawings, the numeral 11 designates generally a telescoping loading and unloading ramp adapted to bridge the space between a doorway, not shown, in the fuselage of an airplane 12 and a point of embarkation and debarkation which may be an elevated walkway 14, although it may also be any other elevated structure suitable for the purpose, such as the second floor in an airport terminal building, not shown. Communicating with the walkway 14 is a supporting means, preferably a rotunda 16, for the inner end of a telescoping ramp means 18. The inner end of the telescoping ramp means 18 is pivotally connected to the rotunda 16 for pivotal movement about a transverse horizontal axis 20 and the rotunda is pivotable about a vertical axis 22 so that the outer end of the telescoping ramp means may be raised and lowered and may be swung horizontally as required to align it with the doorway in the airplane 12. Also, the telescoping ramp means 18 is extensible and contractible so that the outer end thereof may be moved into and out of engagement with the fuselage of the airplane 12 around the doorway therein.

The telescoping ramp means 18 includes at least an inner tunnel 24 and an outer tunnel 26 in telescopic relation, and is shown as including, although it preferably includes, an intermediate tunnel 28, in telescopic relation with the inner and outer tunnels, to minimize the contracted length of the telescoping ramp means. The outer tunnel 26 is supported by a vertically extensible and contractible, self-propelled, steerable truck or vehicle 30 by means of which the telescoping ramp means 18 may be extended and contracted and by means of which the outer end thereof may be swung horizontally and vertically to register it with the doorway in the airplane 12. The truck 30 is shown as located intermediate the ends of the outer tunnel 26 so that the weight of the outer end of the outer tunnel at least approximately counterbalances the weight of the inner end thereof, whereby to minimize any tendency of the telescopic connections between the various tunnels to bind. However, this truck location is not essential. Also, the tunnels 24, 28 and 26 progressively increase in size so that the outer tunnel 26 fits over the intermediate tunnel 28, thereby avoiding any necessity for slotting the intermediate and inner tunnels 28 and 24 to permit connection of the truck 30 to the outer tunnel 26.

As best shown in FIG. 2, the outer tunnel 26 is provided therebeneath with a substructure 32 to which the truck 30 is connected. More particularly, the truck 30 includes a telescoping, vertically extensible and contractible, column means 34 comprising at least a tubular upper column 36 and a tubular lower column 38 in telescopic relation. Actually, in order to increase the range of telescoping movement of the column means 34 to increase the range of vertical travel of the outer end of the telescoping ramp means 18, the column means includes an intermediate tubular column 40 telescopically related to the upper and lower columns 36 and 38.

The column means 34 is extended and contracted in the vertical direction by means, such as a screw means 42, within and coaxial with the column means and interconnecting the upper and lower columns 36 and 38. This screw means is shown as driven by an electric motor 52 through a speed reducing unit 54 and a chain 56 trained around a sprocket on the output shaft of the speed reducing unit and around a sprocket on the screw means. The motor 52 is a reversible one capable of driving the screw means 42 in either direction, depending upon whether it is desired to raise or lower the outer end of the telescoping ramp means 18.

The truck 30 also includes a rigid, open-centered, square or rectangular frame 62 which is connected to the lower end of the lower column 38. More particularly, the lower column 38 extends into the center of the frame 62 and is rigidly secured at its lower end to horizontally spaced and horizontally aligned bearings 64 within the frame 62 at opposite sides thereof. The frame 62 carries horizontally spaced and horizontally aligned stub shafts 66 which project inwardly into the bearings 64 and which cooperate with the bearings to pivotally interconnect the frame and the lower column 38. The bearings 64 and the shafts 66 connect the frame 62 to the lower column 38 for pivotal movement about a horizontal pivot axis which is perpendicular to and intersects the column axis, as will be clear from FIG. 3 of the drawings.

Projecting outwardly from the sides of the frame 62 which are intermediate the sides carrying the stub shafts 66 are horizontally spaced and horizontally aligned axles respectively carrying wheels 68 and 70. These wheels are rotatable about a wheel axis which is perpendicular to and intersects the column axis and which is perpendicular to the horizontal pivot axis of the frame 62. Consequently, if the truck 30 is traversing an irregular surface which supports the wheels 68 and 70 at different levels, the frame 62 is free to pivot about its horizontal pivot axis to equalize the loads on the two wheels.

The wheels 68 and 70 are respectively driven by reversible electric motors 72 and 74 mounted on the frame 62. The motors 72 and 74 drive the respective wheels 68 and 70 through speed reducing units 76 and 78 and through chains 80 and 82, each chain being trained around a sprocket on the corresponding speed reducing unit and a sprocket on the corresponding wheel.

In the particular construction illustrated, the motors 72 and 74 are respectively supplied by motor-generator sets mounted on the substructure 32 below the outer tunnel 26, one of these motor-generator sets being visible in FIG. 2 of the drawings and being designated therein by the numeral 84. The generators of the motor-generator sets respectively include shunt field windings 86 and 88 which are shown diagrammatically in FIG. 10 of the drawings. As will be explained hereinafter in considering the speed control and steering system for the truck 30, the speeds of the motors 72 and 74 are controlled by controlling the potentials applied to the generator field windings 86 and 88, respectively.

The entire truck 30 is pivotable relative to the outer tunnel 26 about the axis of the column means 34, the lower column 38 being rotatable relative to the outer tunnel 26 about the axis of the column means 34 to permit this. By pivoting the wheeled frame 62 so that it is oriented longitudinally of the telescoping ramp means 18, the ramp means can be extended or contracted, depending upon the directions or rotation of the motors 72 and 74, without swinging the ramp means horizontally. By pivoting the wheeled frame 62 so that it is oriented crosswise of the telescoping ramp means 18, the latter may merely be swung horizontally in one direction or the other, depending upon the directions of rotation of the motors 72 and 74. With intermediate orientations, the telescoping ramp means 18 can be swung horizontally and extended or contracted simultaneously. The speed control and steering system of the invention accomplishes the foregoing in a manner to be explained in detail hereinafter.

Turning now to FIG. 7 of the drawings, the outer tunnel 28 is provided at its outer end with a cab 90 mounted for pivotal movement about a vertical axis 92 so that it can be aligned accurately with the portion of the fuselage of the airplane 12 having therein the doorway with which the outer end of the telescoping ramp means 18 is to register. Within the cab 90 is a control unit 94 having pivotally mounted thereon a speed control lever, or other speed control member, 96 and a steering lever, or other steering member, 98. In order to provide the operator of the ramp 11 with a direct indication of the angular position of the truck 30 relative to the telescoping ramp means 18, the truck 30 and the steering lever 98 are interconnected to pivot relative to the telescoping ramp means in synchronism, as will now be described.

Referring to FIGS. 4 to 6 of the drawings, the intermediate column 40 is provided thereon with a bearing collar 100 which is rotatable within the upper column 36 to permit the wheeled frame 62 to pivot relative to the outer tunnel 26 about the axis of the column means 34, as hereinbefore described. However, the lower and intermediate columns 38 and 40 are keyed together for concurrent pivoting about the axis of the column means 34 by means of a key 102 on the intermediate column 40 which is engageable with stops 104 on the lower column. The stops 104 are preferably formed by interrupting an annular bearing collar 106 carried by the lower column 38 and slidably engaging the interior of the intermediate column 40. A drum 108 encircles the lower end of the upper column 36, which is rigidly connected to the substructure 32 on the outer tunnel 26, and is rotatable relative to the upper column on bearing blocks 110 carried by the upper column. The drum 108 is keyed to the intermediate column 40 for concurrent pivoting therewith about the axis of the column means 34 by means of a key 112 mounted on the intermediate column 40 and disposed in a keyway 114 in the drum 108.

Thus, the keys 102 and 112 transmit pivotal movement of the lower column 38 about the axis of the column means 34 to the drum 108 so that the angular position of the drum relative to the outer tunnel 26 always corresponds to the angular position of the wheeled frame 62 relative thereto. It might be pointed out at this juncture that the outer key 112 on the intermediate column 40 is engageable with internal stops 116, FIG. 4, on the upper column 36 to limit pivotal movement of the wheeled frame 62 relative to the outer tunnel 26. In the particular construction illustrated, the limit stops 116 are spaced apart approximately 160° to limit the angular range of pivotal movement of the wheeled frame 62 to approximately 160°, although it will be understood that this angle may be varied.

The concurrent pivoting of the drum 108 with the wheeled frame 62 about the axis of the column means 34 is transmitted to the steering lever 98 in a manner which will now be described. As shown in FIGS. 4 and 5 of the drawings, a chain 118 is wrapped around and secured at its ends to the drum 108 so as to pivot therewith. Intermediate its ends, the chain 118 is trained over a sprocket 120 on a vertical shaft 122 which is rotatably mounted on the upper column 36 and the substructure 32. The shaft 122 carries at its upper end, and just beneath the floor of the outer tunnel 26, a sprocket 124 around which is trained a chain 126.

As shown in FIG. 7 of the drawings, two cables 128, equipped with turnbuckles 130 for tensioning same, are connected to the respective ends of the chain 126. The cables 128 extend forwardly under the outer tunnel 26 and are trained around idler pulleys 132 on the outer tunnel 26. The idler pulleys 132 are located one above the other and the peripheries thereof are located on the vertical pivot axis of the cab 90 so that the cables 128 intersect such axis to prevent pivoting of the cab relative to the outer tunnel from tightening or slackening the cables. The cables 128 then extend to and are connected to the respective ends of a chain 134 trained around a sprocket 136 on the lower end of a vertical shaft 138 mounted on the cab 90 within the control unit 94. The steering lever 98 is connected to the upper end of the shaft 138 in a manner which provides for a slight lost motion therebetween, as will be described.

With the foregoing interconnection between the wheeled frame 62 and the steering lever 98, the position of the steering lever relative to the control unit 94 in the cab 90 always corresponds to the position of the wheeled frame relative to the outer tunnel 26. Thus, the angular position of the steering lever 98 is always indicative of the angular position of the wheeled frame 62.

Turning now to FIGS. 8 and 9 of the drawings, the shaft 138, which will be termed a steering shaft for convenience, has a plate 140 welded, or otherwise secured, thereto adjacent its upper end and within the control unit 94. Mounted on the plate 140 are two steering switches 142 and 144 selectively engageable by a steering member 146, the steering lever 98 having a hub 148 which is telescoped over and pivotable relative to the upper end of the steering shaft 138 and to which the steering member 146 is welded, or otherwise secured. On the opposite side of the steering member 146 from the steering switches 142 and 144 are brackets 150 and 152 mounted on the plate 140 and respectively carrying motion-limiting stop screws 154 and 156 which are engageable with the opposite side of the steering member 146 from the steering switches 142 and 144 and which are respectively located opposite the steering switches 142 and 144. As will be apparent, the stop screws 154 and 156 are so adjusted that, when the steering member 146 is in a neutral position, the steering switches 142 and 144 are not actuated. If the steering member 146 is pivoted relative to the plate 140 slightly in one direction or the other, by pivoting the steering lever 98 slightly in one direction or the other, one or the other of the steering switches 142 and 144 is actuated. Thus, there is a slight lost motion between the steering lever 98 and the steering shaft 138 which is utilized to actuate the steering switches 142 and 144 selectively, such lost motion being limited by the stop screws 154 and 156.

The steering member 146 is biased toward its neutral position relative to the steering switches 142 and 144 by compression springs 158 and 160 disposed within the steering member and each seated against the steering member at one end. The compression springs 158 and 160 encircle guide pins 162 and 164 which are carried by the steering member 146 and which are seated against the respective brackets 150 and 152. The opposite ends of the springs 158 and 160 are seated against spring seats 166 and 168 carried by the respective guide pins 162 and 164. As will be apparent, with this construction, the springs 158 and 160 constantly bias the steering member 146 into its neutral position wherein neither of the steering switches 142 and 144 is actuated. The steering switches 142 and 144 form parts of the steering and speed control circuit of the invention, which will now be considered in conjunction with FIG. 10 of the drawings.

Referring to FIG. 10, the field windings 86 and 88 of the generators are respectively connected in direct current bridge circuits 170 and 172. Common to and forming parts of the bridge circuits 170 and 172 is a variable resistor or rheostat 174 having a movable contact 176 connected to the speed control lever 96 in any suitable manner, not shown. The rheostat 174 includes a resistor 178 which forms two of the arms of each of the bridge circuits 170 and 172. The remaining two arms of the bridge circuit 170 are formed by resistors 180 and 182, respectively, while the remaining two arms of the bridge circuit 172 are formed by resistors 184 and 186, respectively. The resistors 180, 182, 184 and 186 may be variable resistors, as shown, for initially balancing the bridge circuits 170 and 172.

The steering switch 142 includes two ganged, normally open switch elements 188 and 190 which, when closed, shunt portions of the resistors 182 and 184, respectively, to simultaneously, but oppositely, unbalance the two bridge circuits 170 and 172. Similarly, the steering switch 144 includes two ganged, normally open, switch elements 192 and 194 which, when closed, shunt portions of the resistors 180 and 186, respectively, to simultaneously, but oppositely, unbalance the two bridge circuits 170 and 172. It will be apparent that the opposite unbalancing of the two bridge circuits 170 and 172 produced by closure of the switch elements 188 and 190 is opposite to the opposite unbalancing of the two bridge circuits which is produced by closure of the switch elements 192 and 194. Preferably, the resistors 180, 182, 184 and 186 are all substantially equal, and the portions thereof which are shunted by closure of the switches 188, 190, 192 and 194 are substantially equal, so that the two bridge circuits 170 and 172 are oppositely unbalanced to the same extent in both directions, i.e., when the switches 188 and 190 are closed and when the switches 192 and 194 are closed.

Considering the operation of the steering and speed control circuit of the invention as thus far described, it will be apparent that movement of the movable contact 176 of the rheostat 174 in one direction or the other from its neutral position simultaneously and equally unbalances the two bridge circuits 170 and 172 in the same directions. Thus, the motors 72 and 74 are caused to drive the wheels 68 and 70 at the same speeds and in the same directions, the wheels being driven in forward directions in response to movement of the movable contact 176 to one side of neutral and being driven in rearward directions in response to movement of the movable contact to the opposite side of neutral. It can be assumed, for example, that if the movable contact 176 is moved to the right, as viewed in FIG. 10 of the drawings, the two wheels 68 and 70 will be driven in forward directions at equal speeds to extend the telescoping ramp means 18. It will be understood, of course, that the speeds of the wheels 68 and 70 depend upon the extent of movement of the movable contact 176 of the rheostat 174 from its neutral position. Thus, the rheostat 174 controls the speeds of both of the wheels 68 and 70 and varies the speeds thereof equally.

It will now be assumed that it is desired to steer the telescoping ramp means 18 in one direction or the other. To accomplish this, the operator moves the steering lever 98 in the corresponding direction to actuate the corresponding one of the steering switches 142 and 144, e.g., the steering switch 144. This has the effect of closing the shunting switch elements 192 and 194. The resulting opposite unbalances of the two bridge circuits 170 and 172 will cause the motors 72 and 74 to drive the respective wheels 68 and 70 at different relative speeds to swing the telescoping ramp means 18 horizontally in the corresponding direction. The reverse occurs if the steering lever 98 is moved in a direction to actuate the steering switch 142, thereby closing the shunting switch elements 188 and 190. Thus, the operator can steer the telescoping ramp means 18 in opposite directions by the simple expedient of moving the steering lever 98 in one direction or the other to actuate one or the other of the steering switches 142 and 144, which steering switches oppositely unbalance the two bridge circuits 170 and 172 in opposite directions.

It will be understood that the speed control lever 96 and the steering lever 98 may be operated simultaneously to steer in either direction at any speed in the forward or rearward direction. Also, the steering lever 98 may be operated alone, with the speed control lever 96 in its neutral position, to steer in either direction with no forward or rearward movement of the truck 30, the latter merely pivoting about the axis of the column means 34 under such conditions.

In the foregoing connection, it is important to note that when maximum steering is utilized, i.e., when the truck 30 is simply allowed to pivot about its vertical axis with no forward or rearward movement of the truck, the average wheel speed is equal to zero, since the two wheels are turning in opposite directions at equal speeds, and the turning radius of the truck is zero since it is merely swiveling about its own vertical axis. On the other hand, if the truck 30 is moving forwardly or rearwardly, in addition to turning, the turning radius of the truck inherently increases as the average wheel speed increases. In other words, the steering and speed control circuit shown inherently causes the turning radius of the truck 30 to increase as its forward or rearward speed increases, which is highly desirable and which represents an important feature of the invention.

To prevent oversteering, the circuit of the invention includes means for limiting the range of pivotal movement of the truck 30 relative to the outer tunnel 26 to a predetermined value, e.g., 160°. As shown in FIG. 4 of the drawings, the upper column 36 is provided thereon with limit switches 196 and 198 spaced, for example, 160° apart and selectively engageable by an actuator 200 on the drum 108. Preferably, the limit stops 116 are spaced apart slightly farther than the limit switches 196 and 198 so that the limit stops do not come into action unless the limit switches are inoperative for any reason.

Referring to FIG. 10 of the drawings, the limit switch 196 includes ganged switch elements 202, 204 and 206, the switch elements 202 and 204 being normally closed and respectively connected in series with the switch elements 188 and 190, and the switch element 206 being normally open and connected in parallel with the switch element 192. Thus, if the limit switch 196 is actuated by oversteering in the corresponding direction, the switch elements 202 and 204 are opened to cancel the steering signal produced by the switch elements 188 and 190. At the same time, the switch element 206 is closed to produce a steering signal in the opposite direction. This has the effect of automatically turning the truck 30 away from the corresponding limit position to prevent over-steering damage and to positively warn the operator that he has oversteered.

Similarly, the limit switch 198 includes ganged switch elements 208, 210 and 212, the switch elements 208 and 210 being normally closed and respectively being connected in series with the switch elements 192 and 194, and the switch element 212 being normally open and being connected in parallel with the switch element 190. Thus, in the event of oversteering which results in actuation of the limit switch 198, the steering signal produced by the switch elements 192 and 194 is cancelled and a reverse steering signal is introduced by the switch element 212, again to prevent oversteering damage and to provide a positive warning to the operator that he has oversteered by causing the truck 30 to back away from the corresponding limit position.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In a speed control and steering system for a self-propelled steerable vehicle which includes a frame pivotable about a vertical axis, two wheels rotatably mounted on said frame on opposite sides of said vertical axis, and two reversible motors mounted on said frame and respectively connected to said wheels in driving relations therewith, the combination of: two bridge circuits respectively operatively connected to said motors for controlling the respective speeds thereof; speed control means common to and forming parts of said bridge circuits for simultaneously and equally unbalancing said bridge circuits in the same directions to simultaneously and equally vary the speeds of said motors in the same directions; and steering means for relatively unbalancing said bridge circuits in opposite directions so as to vary the relative speeds of said motors.

2. In combination with a self-propelled steerable vehicle which includes a frame pivotable about a vertical axis, two wheels rotatably mounted on said frame on opposite sides of said vertical axis, and two reversible motors mounted on said frame and respectively connected to said wheels in driving relations therewith, a speed control and steering system for said vehicle, including: two bridge circuits respectively operatively connected to said motors for controlling the respective speeds thereof; speed control means common to and forming parts of said bridge circuits for simultaneously and equally unbalancing said bridge circuits in the same directions to simultaneously and equally vary the speeds of said motors in the same directions; steering means interconnecting said bridge circuits for simultaneously, but oppositely, unbalancing said bridge circuits so as to simultaneously, but oppositely, vary the speeds of said motors; and means responsive to pivoting of said frame about said vertical axis to predetermined positions by said steering means for reversing the opposite unbalance of said bridge circuits.

3. In a speed control and steering system for a self-propelled steerable vehicle which includes a frame pivotable about a vertical axis, two wheels rotatably mounted on said frame on opposite sides of said vertical axis, and two reversible motors mounted on said frame and respectively connected to said wheels in driving relations therewith, the combination of: two bridge circuits respectively operatively connected to said motors for controlling the respective speeds thereof; speed control means common to and forming parts of said bridge circuits for simultaneously and equally unbalancing said bridge circuits in the same directions to simultaneously and equally vary the speeds of said motors in the same directions; and steering means interconnecting said bridge circuits for simultaneously and equally, but oppositely, unbalancing said bridge circuits so as to simultaneously and equally, but oppositely, vary the speeds of said motors.

4. In combination: two bridge circuits; means common to and forming parts of said bridge circuits for simultaneously and equally unbalancing said circuits in the same directions; and means for relatively unbalancing said bridge circuits in opposite directions.

5. In combination: two bridge circuits; means common to and forming parts of said bridge circuits for simultaneously and equally unbalancing said circuits in the same directions; and means interconnecting said bridge circuits for simultaneously, but oppositely, unbalancing said bridge circuits.

6. In combination: two bridge circuits; means common to and forming parts of said bridge circuits for simultaneously and equally unbalancing said circuits in the same directions; and means interconnecting said bridge circuits for simultaneously and equally, but oppositely, unbalancing said bridge circuits.

7. In combination: two bridge circuits; means common to and forming parts of said bridge circuits for simultaneously and equally unbalancing said circuits in the same directions; means interconnecting said bridge circuits for simultaneously, but oppositely, unbalancing said bridge circuits; and means for reversing said opposite unbalance of said bridge circuits.

References Cited in the file of this patent

UNITED STATES PATENTS

| | | |
|---|---|---|
| 644,853 | Fahl | Mar. 6, 1900 |
| 803,008 | Moorrees | Oct. 31, 1905 |
| 1,038,615 | Macrae | Sept. 17, 1912 |
| 2,362,636 | Joy | Nov. 14, 1944 |
| 2,528,575 | Broadbent | Nov. 7, 1950 |
| 2,535,108 | Warshawsky | Dec. 26, 1950 |
| 2,565,293 | Aydelott | Aug. 21, 1951 |
| 2,798,565 | Rosenthal | July 9, 1957 |